United States Patent [19]
Cornell

[11] 3,985,055
[45] Oct. 12, 1976

[54] SAWMILL APPARATUS

[76] Inventor: Cyrus J. Cornell, P.O. Box 18, Laceyville, Pa. 18623

[22] Filed: June 2, 1975

[21] Appl. No.: 582,747

[52] U.S. Cl. .................................. 83/367; 83/159; 83/408; 83/418; 83/419; 83/422; 83/425.3; 83/436; 83/732
[51] Int. Cl.² .................... B26D 7/06; B27B 25/02; B27B 31/04
[58] Field of Search ............ 83/367, 159, 408, 418, 83/419, 422, 425.3, 436, 732

[56] References Cited
UNITED STATES PATENTS

| | | |
|---|---|---|
| 527,051 | 10/1894 | Cramby ............................. 83/408 |
| 2,399,822 | 5/1946 | Norton .............................. 83/425.3 |
| 3,068,915 | 12/1962 | Arnett .............................. 83/408 X |
| 3,866,502 | 2/1975 | Brewer, Sr. ....................... 83/425.3 X |

Primary Examiner—Frank T. Yost
Attorney, Agent, or Firm—Richard G. Stephens

[57] ABSTRACT

A sawmill assembly allows a single operator to selectively control both cutting to length and gang sawing of cants to make pallet stock, eliminating the danger and labor of hand feeding a gang saw, and allowing efficient use of wood by operator selection of gang saw cut direction. A rapidly-acting improved cant turner is disclosed.

15 Claims, 15 Drawing Figures

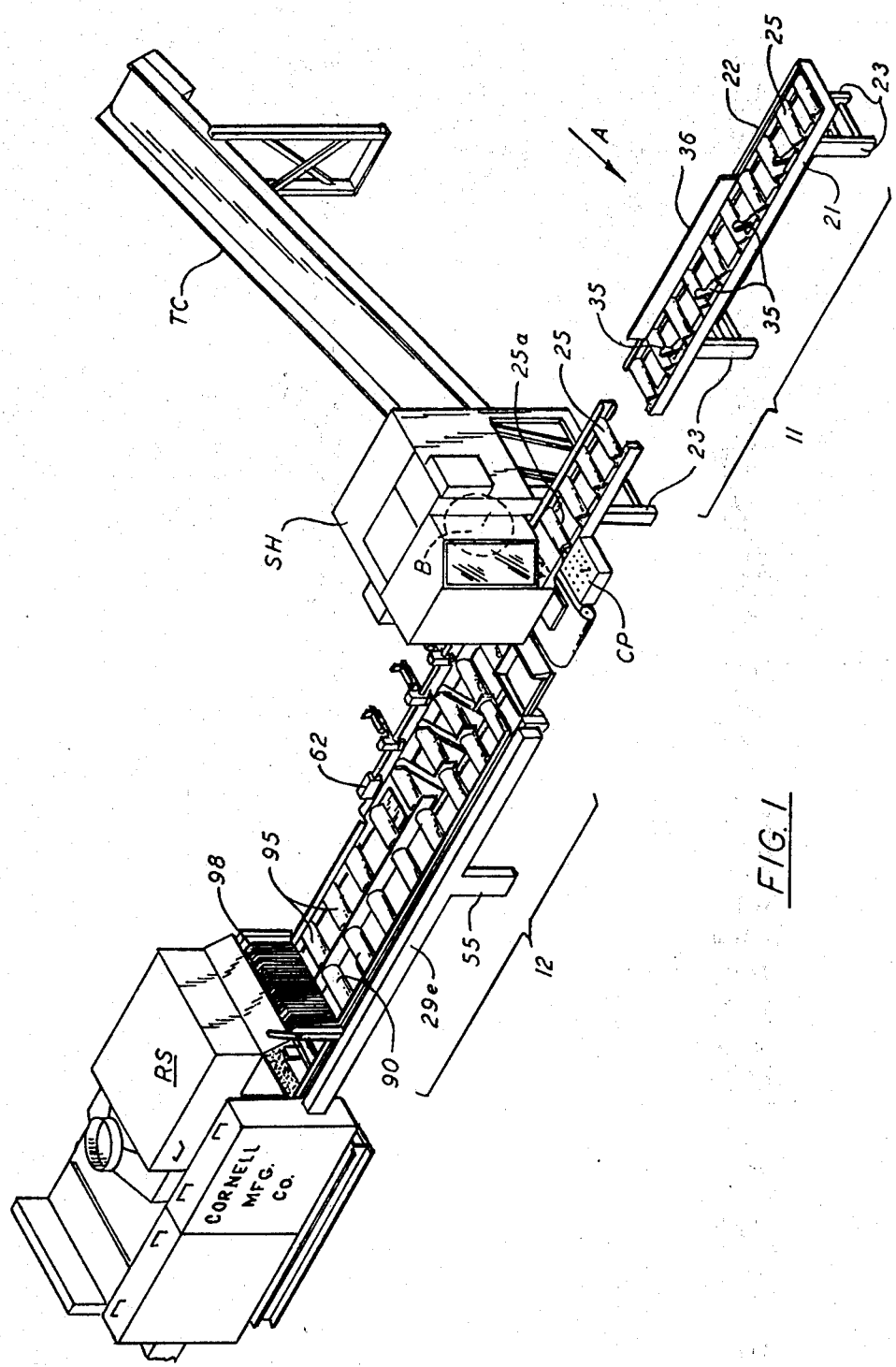

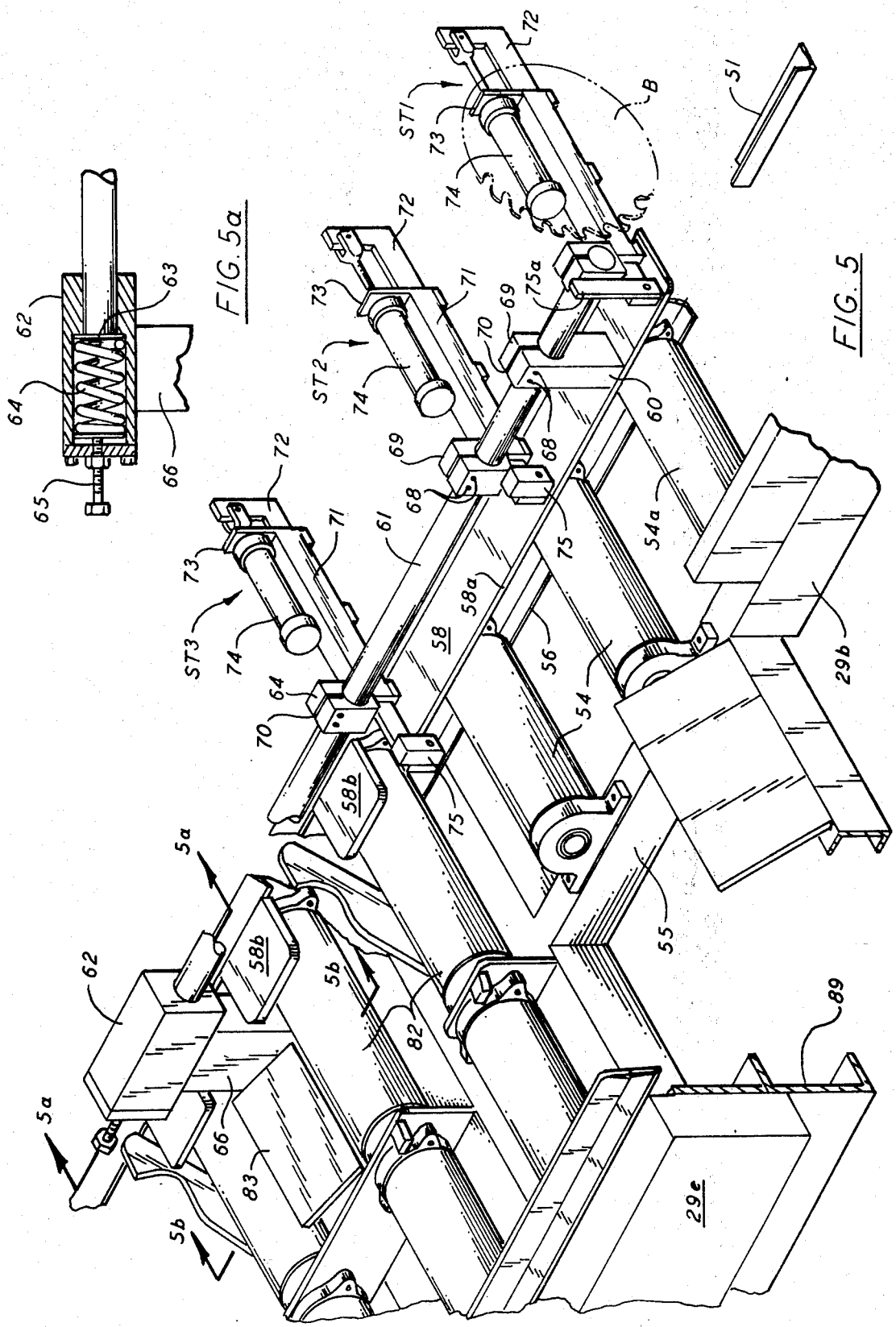

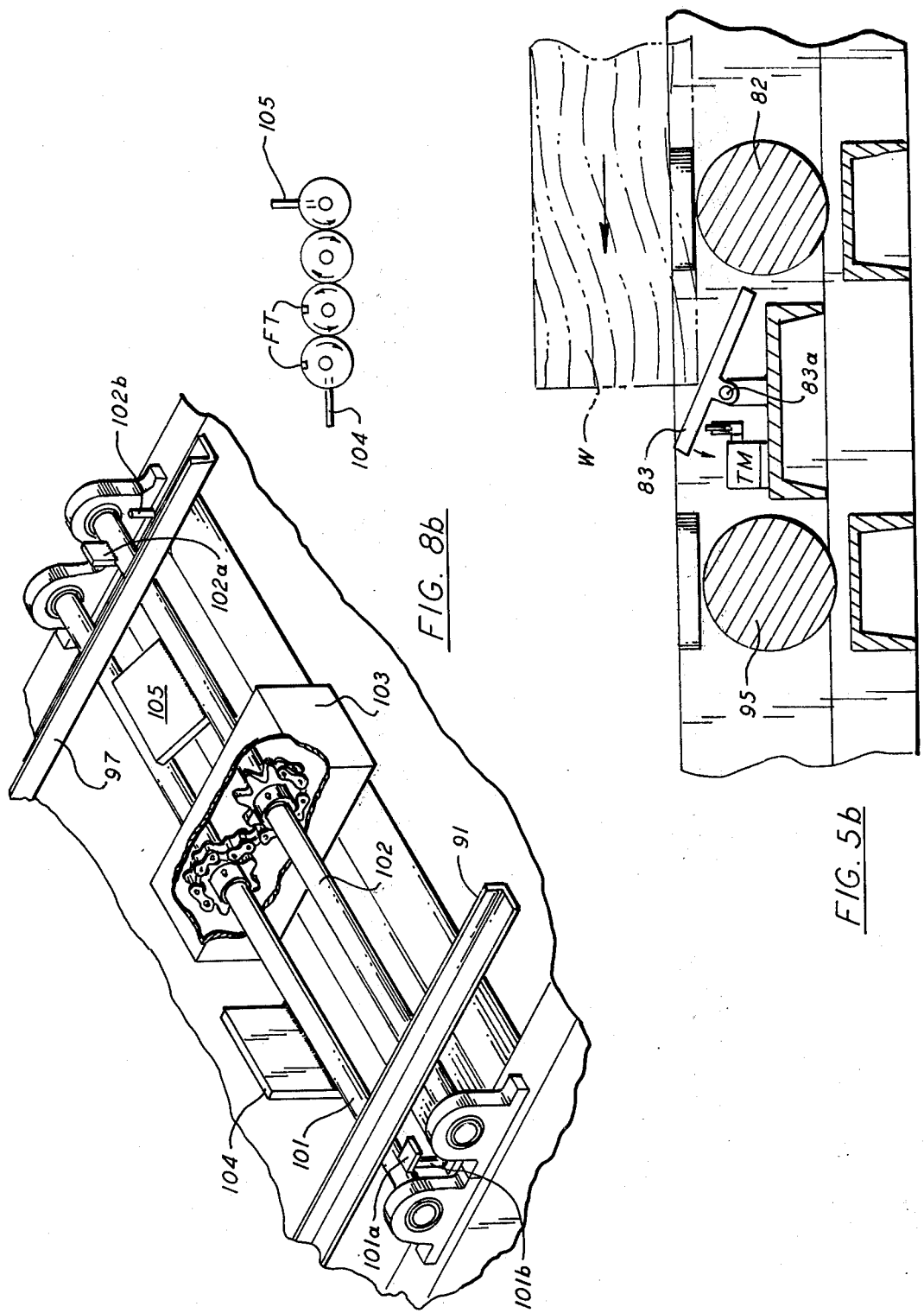

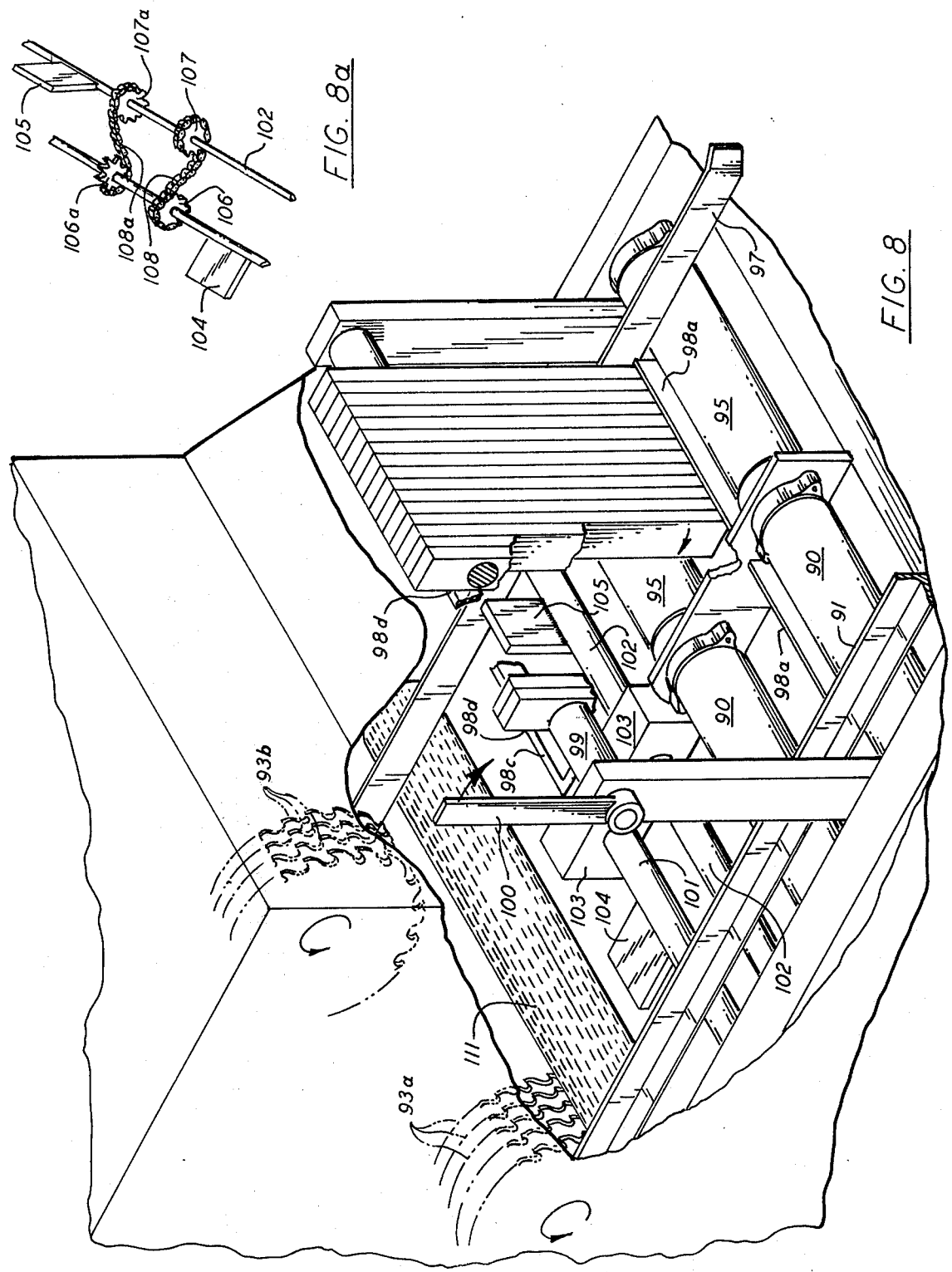

SAWMILL APPARATUS

This invention relates to sawmill apparatus, and paricularly to apparatus which will allow an operator to rapidly and efficiently cut cants into pallet stock, although it will become clear that other types of wood-cutting also may be performed with the apparatus, such as the production of dimension stock, furniture stock and crating stock.

A cant is a piece of wood of generally rectangular cross-section from the heart of a tree which remains after higher-quality slabs have been rough-sawn from the outer layers of a tree. Most cants have a 4-inch or 6-inch thickness and widths typically varying between 6 and 10 inches. A large number of cants are commonly cut up to make wood pallets for use in material-handling. A pallet typically comprises three or four "stringer" boards having a given cross-section (such as 2 × 4 inches) which are spaced apart and interconnected on their top edges, or top and bottom edges, by deck boards having a different cross-section (such as 1 × 4 inches). the lengths of stringer boards and the deck boards are typically 3 to 4 feet, in various standard lengths, such as 32, 36, 40 or 48 inches. In numerous sawmills eqipped to produce pallet stock, successive cants having standard thicknesses, such as 4 or 6 inches, and numerous different widths and lengths, are first cut into standard lengths such as 3 or 4 feet, using a "trim and cut to length" cross-cut saw. The cross-cut saw ordinarily includes an in-feed conveyor comprising operator-controllable powered rolls, an out-feed conveyor of a generally similar nature, and a powered reciprocable circular saw-blade situated at the adjacent ends of the two conveyors, which the operator may cause to move perpendicularly to the lengths of the conveyors to saw a cant in two. In the prior art, cants usually have been placed manually on the in-feed table by two workers, or by another conveyor device. By operating a selected one of various push-button switches, the operator of the cross-cut saw may cause a selected one of a plurality of hydraulically or pneumatically-operated stops to extend partly across the out-feed table. After a cant has been placed atop the in-feed conveyor, the operator ordinarily extends a stop which is located a very short distance (e.g. 1 inch) beyond the saw blade, he controls the in-feed conveyor to advance the cant until its leading edge strikes the stop, and then he causes the blade of the cross-cut saw to reciprocate prependicularly to the conveyor direction, to saw through the cant near its leading end, thereby to square the leading end of the cant. Then a second stop located a desired distance, say 4 feet, beyond the saw blade is instead extended, the cant advanced until the now squared leading end strikes the second stop, and then the rotating circular saw is again reciprocated to saw through the cant, thereby to provide a cut length of 4 feet. Such a process then may be repeated, until as many 4-foot lengths as can be provided from the cant have been cut. As each standard or measured length is cut from the cant, it is propelled forwardly away from the saw on the out-feed table or conveyor, which may be arranged to convey the standard length pieces to another conveyor. The other conveyor conveys the standard length pieces to the in-feed conveyor of a multiple-blade ripping saw, dumping them one at a time on to the in-feed conveyor table of the ripping saw. The ripping saw, or "resaw", is operated by a second operator, and may comprise a single gang of saw blades spaced to cut stringer boards or instead spaced to cut deck boards. Some prior resaws include double bays with gangs of blades for both stringers and deck boards, so that the resaw operator can manually push a board to one side or the other of the resaw, to determine whether it will be cut into deck boards or into stringers.

It is of great importance that as many as possible usable pieces for pallets be obtained from a given load of cants. Because of its size, and the places where it may contain various defects such as knots, a given cant may be used much more efficiently if sawed into stringer boards, while another cant might be better suited to make pallet deck boards. For example, a knot of 1 inch diameter which extended through the middle of a 2 × 4 stringer would not appreciably weaken the stringer, but the same knot would make a 1 × 4 deck worthlesslly weak if it extended across the width of the deck board. Loads of cants are delivered to the sawyer unsorted as between the types of its defects such as knots, and sorting the cants into the two types would tend to require extensive manual labor. While some prior trimming and cut-to-length cross-cut saw assemblies used in sawmills enable an operator to readily cut cants into pieces of varying lengths, so that an operator can readily cut successive pieces in either stringer length or deckboard length and thus use a cant efficiently in some respects, the cut pieces then would have to be manually sorted, and then fed either to a multiple-blade ripping saw which is set up to cut stringer boards or to a different saw set up to cut deck boards. If a double-bay saw is used, an operator must stand in from of the saw to sort the cut pieces, feeding them to the proper bay of the resaw. Despite various safeguards which are built into most resaws, the job of feeding cut pieces of cants into one bay or the other of a double-bay resaw tends to be a dangerous one, as such saws frequently discharge pieces of wood at lethal velocities. One object of the present invention is to provide improved sawmill apparatus wherein an operator need not manually sort cut pieces of cants as they are delivered to a resaw to selectively feed them into one bay or the other of a double-bay resaw, thereby eliminating a dangerous job.

Aside from the danger of sorting cut pieces "on-line" and feeding them into a resaw, any second inspection of pieces, after they have been cut to length, in order to determine whether they should become stringers or deck boards, represents wasted labor. Furthermore, a person who is sorting cut pieces and feeding them to one or two resaws may not know whether the person who previously cut a piece to length intended the piece to be sawed into stringers or instead into deck boards, since both pieces may be the same or about the same length. Both the wasted labor of double inspection and wasted wood resulting from differing operator decisions may be eliminated by the present invention, wherein a single operator can control both cutting to length and subsequent ripping into stringers or deck boards, and provision of such apparatus is a primary object of the invention.

Another object of some embodiments of the invention is to provide a sawing assembly incorporating a double-bay gang saw in which simultaneous feeding of wood pieces into both bays may be automatically prevented, thereby leading to a more economical construction.

Various sawing operations require or desirably include means for rotating or turning cants about their lengthwise axis. One prior art cant turner includes a plurality of Y-shaped yokes carrying sprockets and loops of roller chain driven by individual motors and gearboxes. To rotate a cant the yokes are moved upwardly between various rollers of an in-feed table to lift the cant above the rollers, and then the roller chain loops are rotated. Such an arrangement is complex, expensive, and subject to wear, and has limited operating speed. Another object of the present invention is to provide a simple, reliable, less expensive and faster apparatus for turning cants. The mentioned prior art cant turner is also disadvantageous in that it tends to require precise operator control and attention or timing, since the amount which a cant is rotated depends upon the time period during which the operator operates the turning motors. In the absence of precise timing he may rotate the cant to a position such that a corner of the cant rather than a flat surface will engage the conveyor rolls when the yokes are lowered to re-lower the cant onto the rolls, and the cant may fall to a different angle than that intended. Such timing errors can be obviated, of course, by driving the turning motors slowly, but then rotation of the cant occurs undesirably slowly. Thus another object of the present invention is to provide an improved cant turning mechanism which does not require operator timing, and which will rotate a cant in discrete 90° increments of rotation rapidly and accurately.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a perspective view of an exemplary form of sawing assembly of the present invention with a portion of the in-feed conveyor cut away for drafting convenience.

FIG. 5 is a perspective view, with various parts cut away, of a portion of the out-feed conveyor apparatus of the assembly of FIG. 1.

FIG. 5a is a cross-section elevation view of a device shown in FIG. 5.

Figure 6A:
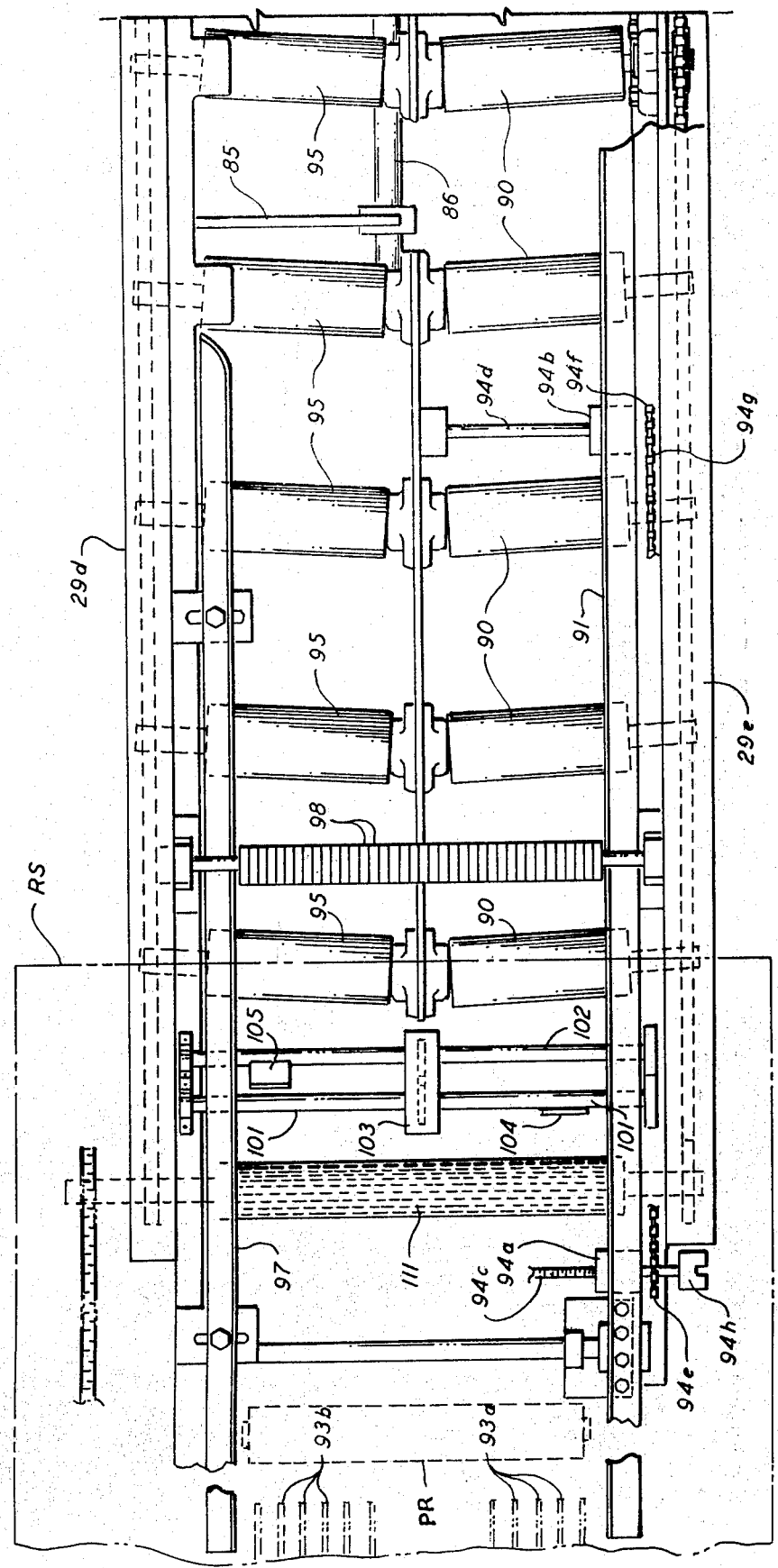
Figure 6B:
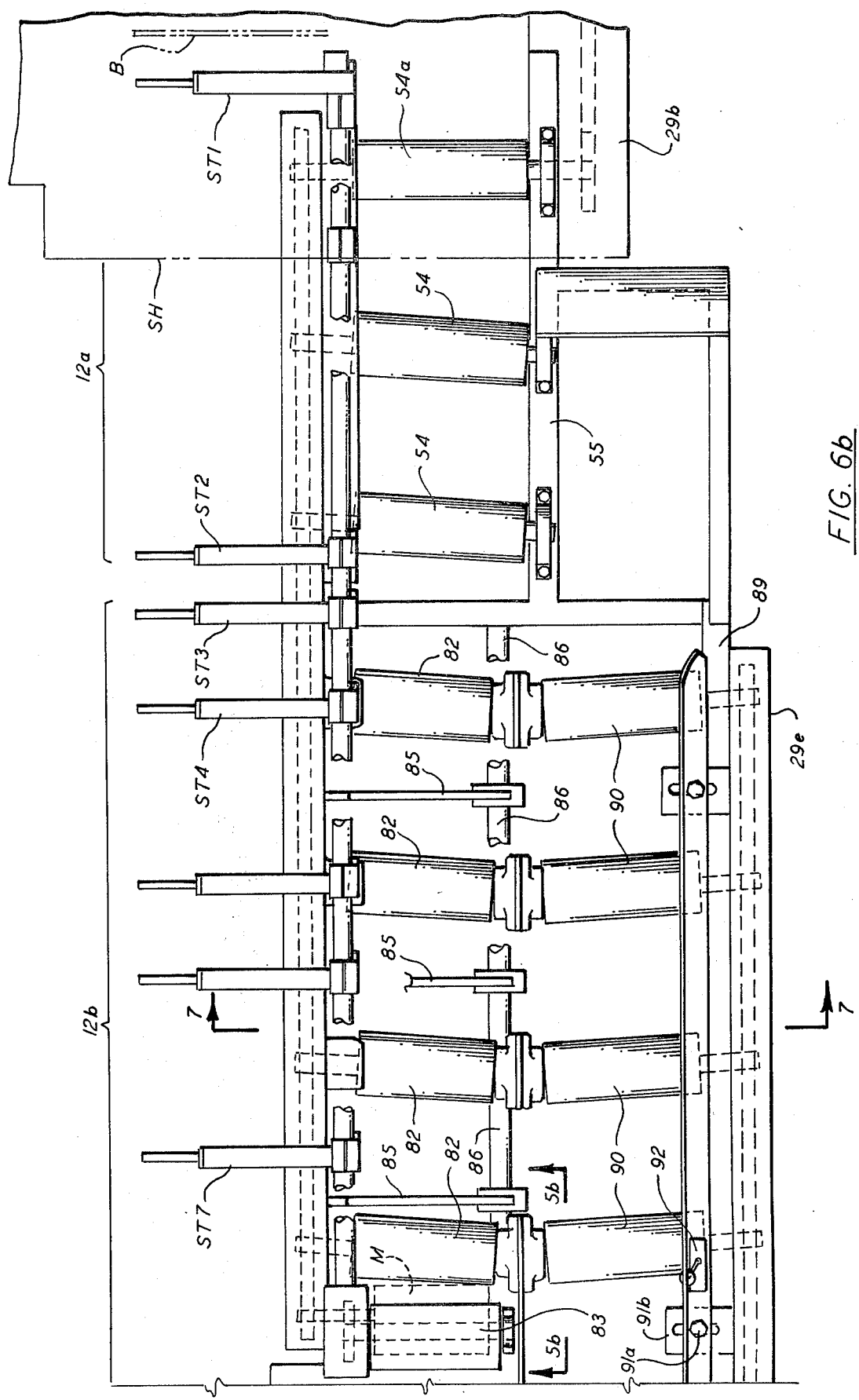

FIGS. 6a and 6b, which may be placed end to end, are plan views illustrating the outfeed conveyor section of the assembly of FIG. 1, with portions of the cross-cut saw and multiple-blade ripping saw shown.

Figure 7:
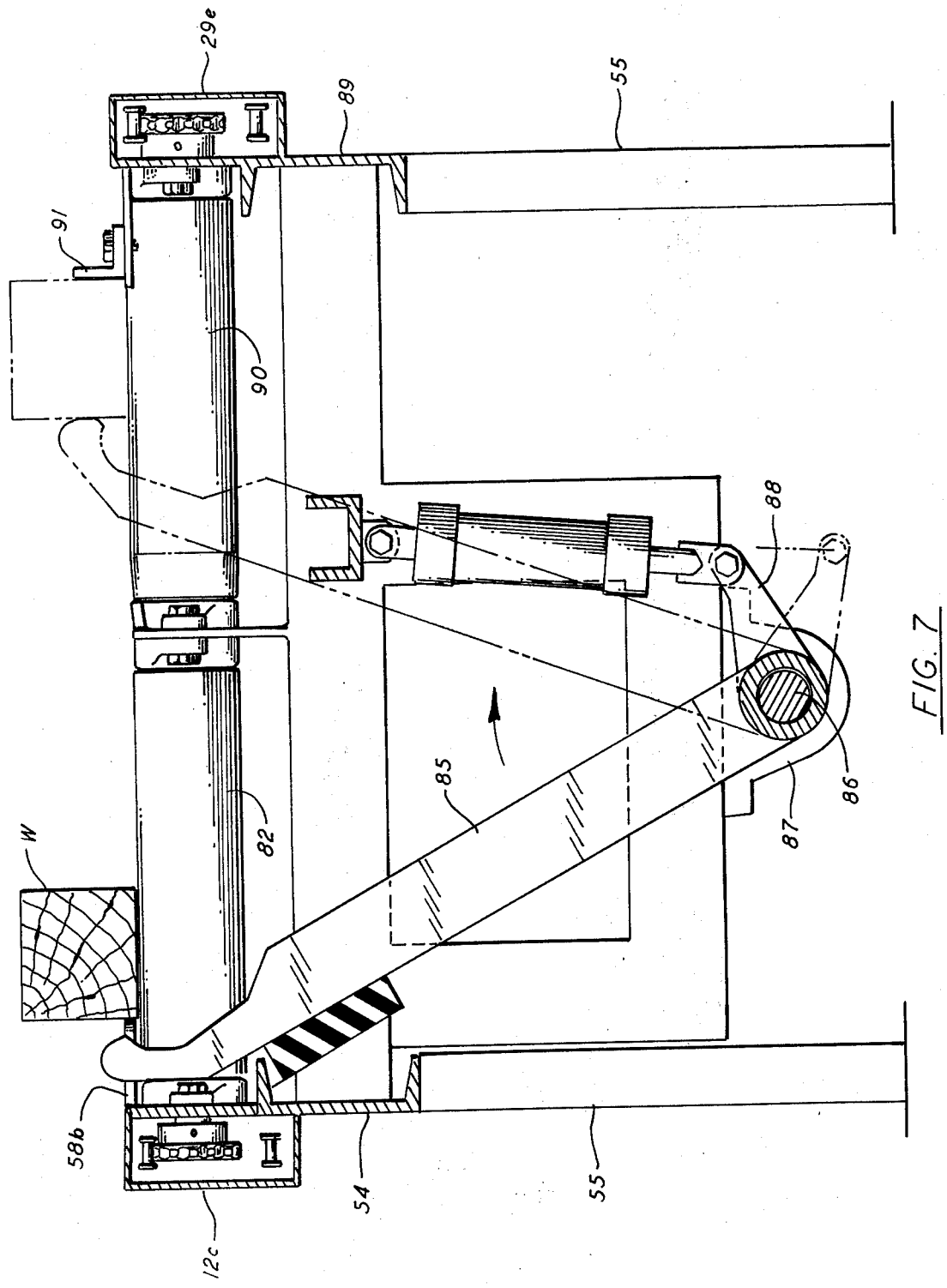

FIG. 7 is a section view taken at lines 7—7 in FIG. 6b.

FIG. 8 is a perspective view illustrating portions of the ripping saw assembly with certain parts cut away.

FIG. 8a is a diagram helpful in understanding the operation of a device shown in FIG. 8.

FIG. 8b is a perspective view of a modified form of the device illustrated in FIG. 8a.

FIG. 5b is a cross-section view taken at lines 5b—5b in FIG. 6b.

In FIG. 1 an assembly according to the present invention is shown as including an in-feed roller conveyor section 11, an out-feed roller conveyor section 12, a powdered, reciprocable, circular saw contained within a housing SH, and a double-bay gang circular saw assembly RS. The operator stands adjacent a control panel CP, and operates switches thereon to control the entire assembly. Cants are fed sidewise one at a time onto in-feed conveyor 11, in the direction shown by arrow A in FIG. 1, preferably from any one of a number of known conveyor systems, such as a live deck equipped with pin stops (i.e. a conveyor with powdered rolls and stops which the operator may lower by remote control), or a cockscomb feeding device known in the art.

Figure 2A:
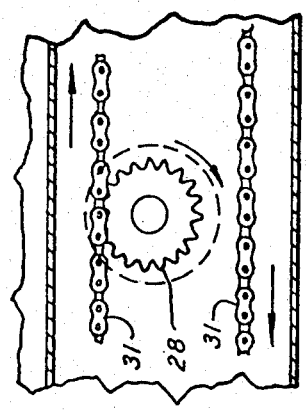
FIG. 2a is a section view taken at lines 2a—2a in FIG. 2.
Figure 2:
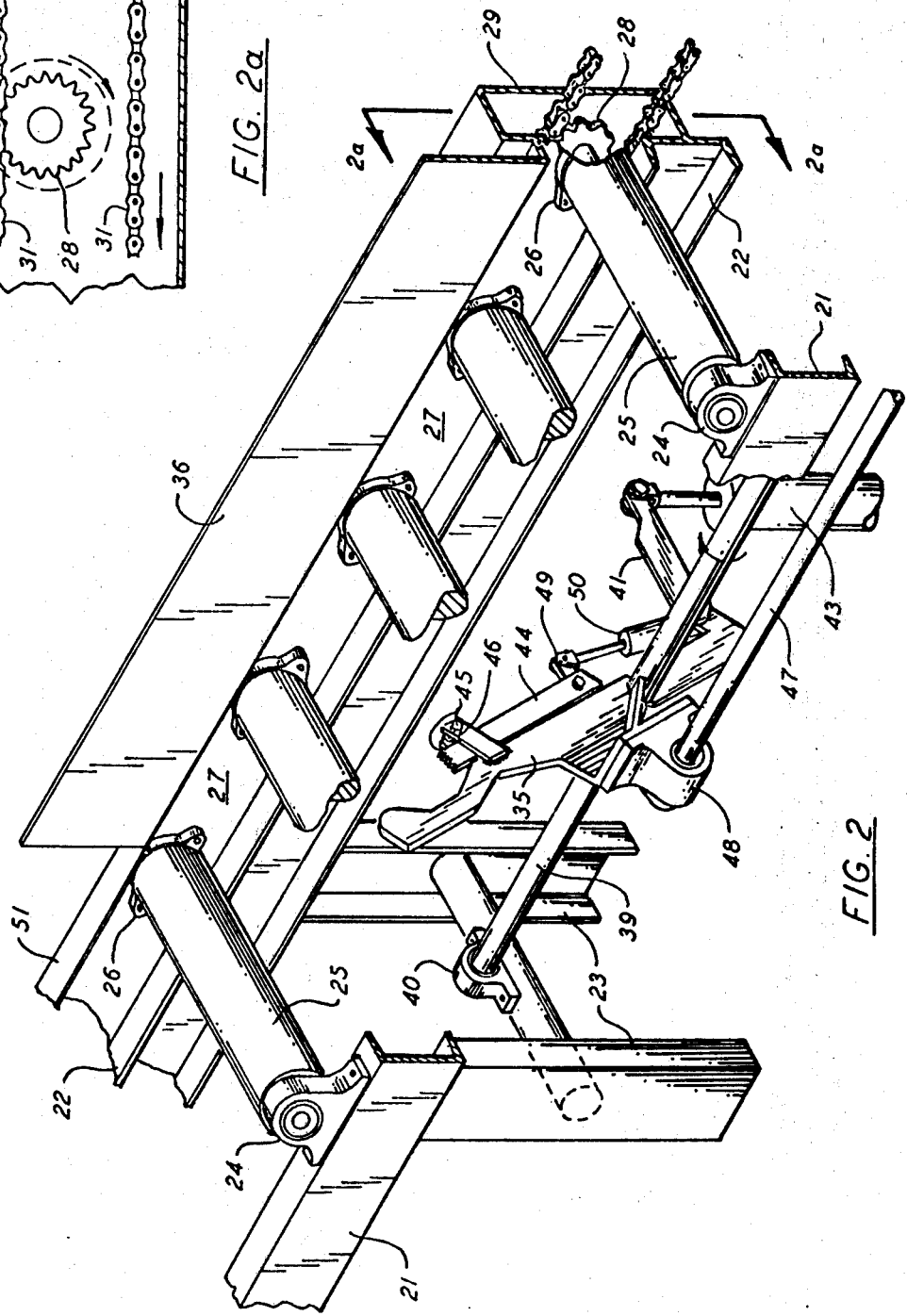
FIG. 2 is a perspective view of a portion of the in-feed conveyor with various portions cut away and other portions shown in phantom to afford a better view of portions of the invention.

As seen in FIGS. 1 and 2, the in-feed conveyor comprises a pair of parallel spaced-apart channel members 21,22 supported above the floor on legs 23,23. A portion of outer channel 21 is cut away in FIG. 2. A plurality of pillow-block bearings 24,24 (FIG. 2) mounted atop channel 21 rotatably support one end of each of a plurality of rolls 25,25, several of which are shown in cutaway phantom in FIG. 2. The inner end of each roll 25 includes a shaft journalled in and extending through a respective bearing 26 mounted on plate 27, with a sprocket 28 on the end of each roller shaft, located within a sprocket housing 29. The upper course of roller chain 31 engages each sprocket 28, as illustrated in FIG. 2a, and thus the driving of chain 31 rotates all the in-feed conveyor rollers 25 at the same speed. The axes of rotation of all of the in-feed rollers 25 (except the one adjacent the saw blade and indicated at 25a in FIG. 1) are slightly canted at a small angle (e.g. 5°) from the normal to the longitudinal direction of channels 21,22, so that the end of each such roll near channel 21 leads, or is slightly forward of the other roller end. Due to such angular canting of the rolls, a cant lying atop rollers of the in-feed conveyor will be urged with a slight lateral component toward the channel 22 side of the in-feed conveyor as rotation of the rollers 25 advances the cant generally longitudinally along rollers toward the saw assembly at SH, maintaining the cant against the guide rail 51.

Figure 3A:
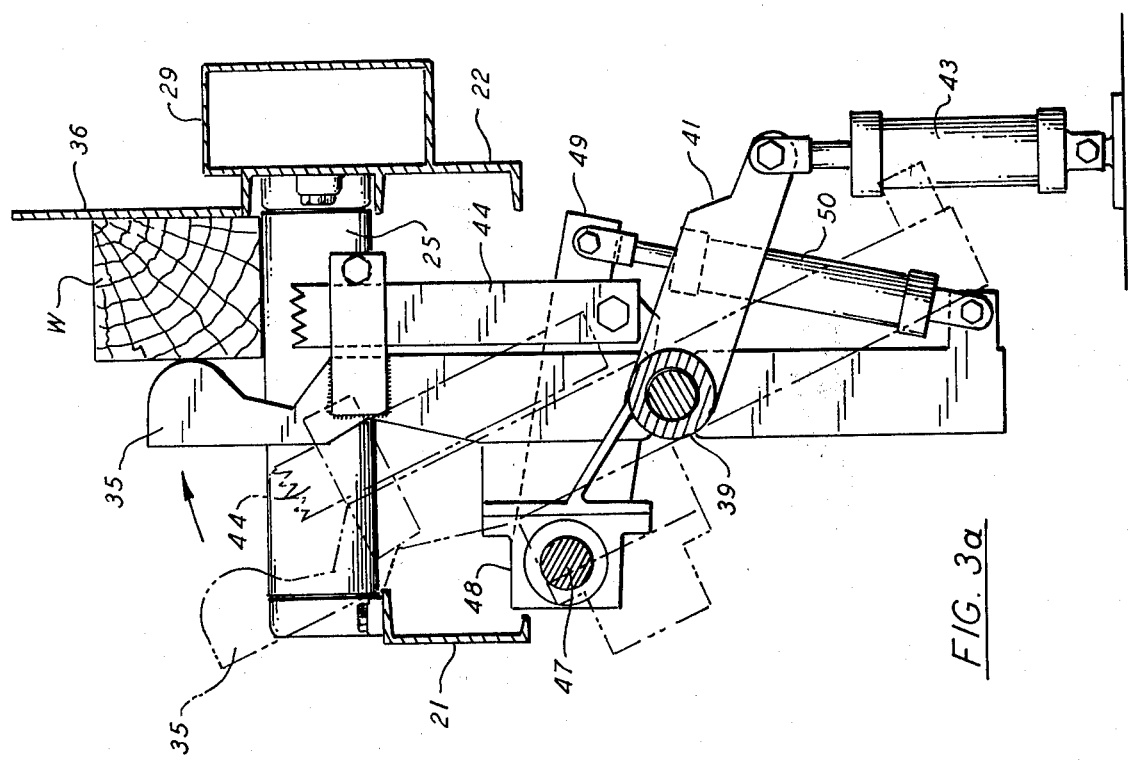
FIGS. 3a and 3b are end views of the apparatus of FIG. 2 showing the parts thereof in two different operating positions.

While it has been stated that cants are placed on the in-feed table 11 in the direction of arrow A in FIG. 1, cants in fact may be dropped onto the rollers of the in-feed conveyor from either side of the conveyor, or fed endwise onto the end of the in-feed conveyor. Such endwise feeding may be preferred, for example, where cants are planed prior to being cut to length, which is sometimes desired. When dropped on the in-feed conveyor, a cant ordinarily will not be precisely aligned in the longitudinal direction of the conveyor. By operation of a plurality of kicker arms 35,35 the cant may be slid laterally on the conveyor, to press one side of the cant against guide plate 36. As shown in FIG. 3, the in-feed conveyor includes a plurality of kicker arms which extend up between various of the rolls of the in-feed conveyor. In FIG. 2 and FIG. 3a one kicker arm 35 is shown carried on a shaft 39 rotatably journalled as at 40 (FIG. 2) beneath the rollers of the in-feed conveyor. In FIG. 3a a kicker arm assembly is shown in dashed lines at the normal or rest position it will have as a cant is dropped on the in-feed conveyor, and shown in solid lines at its operated position as it urges a cant W against guide plate 36 on the inner side of the conveyor. Arm 41 extending radially from shaft 39 is engaged by ram 43 mounted on the floor below the conveyor. Thus as ram 43 is retracted to rotate shaft 39 clockwise in FIG. 3a, the upper end of kicker arm 35 moves toward guide plate 36, urging the cant against the guide plate. Each of the other kicker arms 35 are carried similarly on shaft 39. Thus a cant placed on the in-feed table 11 may be forced against guide plate 36 by the kicker arms 35,35, and then as rolls 25 are rotated to move the cant toward the cross-cut saw assembly, the angular canting of the rolls maintains the cant against guide rail 51 which extends longitudinally from guide plate 36 at the same lateral position.

Figure 3B:
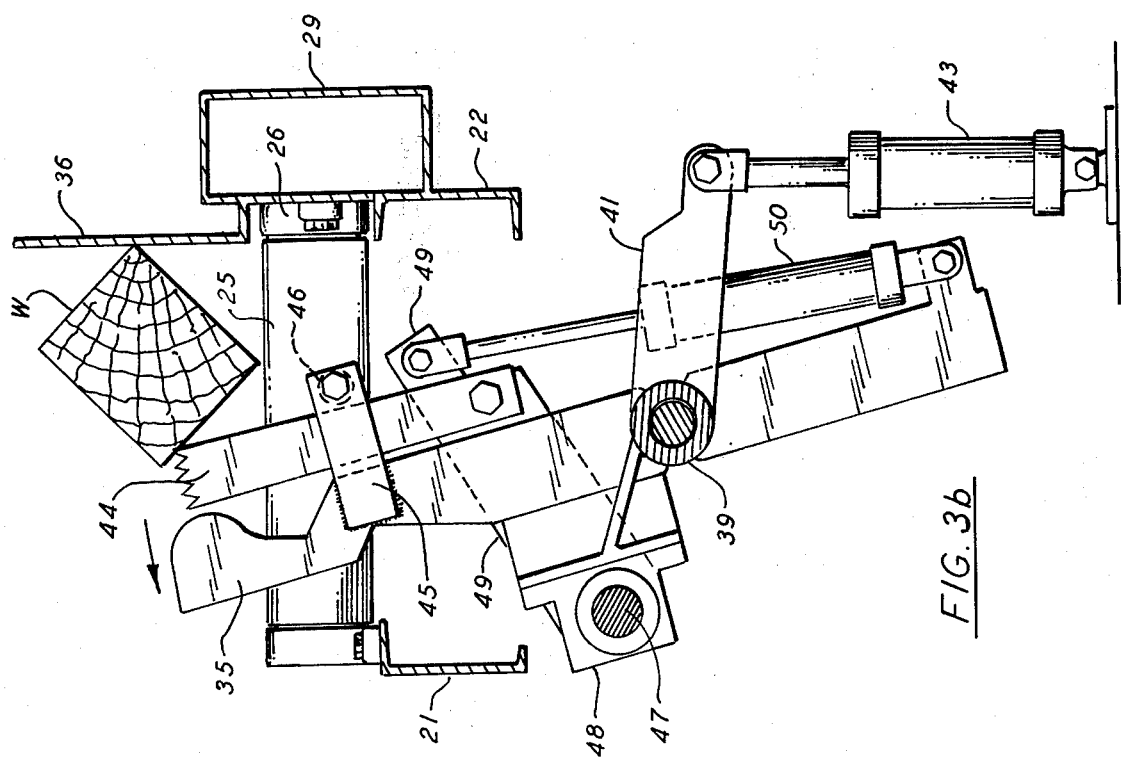

The arrangement and use of kicker arms as thus far described is by no means novel. However, in accordance with the preferred form of the present invention, a respective reciprocable pusher bar 44 is bodily carried on several or all of the kicker arms 35, and a ram 50 for operating the pusher bars is bodily carried on one of the kicker arms 35 of the in-feed conveyor assembly. In FIG. 2 pusher bar 44 is shown slidingly retained on kicker arm 35 by a pair of welded tabs 45,45 on opposite sides of the pusher bar, and a roller 46. Shaft 47 is journalled in pillow-block bearings 48 carried on each of the kicker arms 35,35. A plurality of arms 49,49 extend radially from shaft 47, each engaging the lower end of a respective pusher bar 44. Extensible ram 50 carried on one of the kicker arms engages the radial arm 49 connected to the pusher bar carried on that kicker arm. As ram 50 is extended, it rotates shaft 47 counterclockwise as viewed in FIG. 3a or FIG. 3b, raising each of the pusher bars 44. If ram 50 is extended from its retracted position as the kicker arms 35 are backed away from the cant, the extension of the serrated or roughened upper end of each pusher bar 44 will apply a torque to the lower outer corner of the cant, thereby rotating the cant 90°. Each pusher bar 44 moves substantially parallel to the kicker arm on which it is mounted. In FIG. 3b the assembly is shown in an intermediate position as a cant W is being rotated 90°. Ram 43 is being extended to rotate the kicker bars 35 and the pusher bars 44 counterclockwise, while ram 50 is simultaneously being extended to also move the pusher bars upwardly as they swing counterclockwise with the kicker arms 35. The serrated upper ends of pusher bars 44,44, thereby apply a clockwise moment to the cant W, rotating the cant. Upon continued motion past the condition shown in FIG. 3b, it will be apparent that the upper end of the pusher bar will clear the corner of the cant, leaving the cant turned 90° from its prior position. The simultaneous actuation of rams 43 and 50 is accomplished by simple electrical switching. One pushbutton switch on control panel CP (FIG. 1) may operate a solenoid valve (not shown) to extend ram 43 to rotate kicker arms 35, and another such switch may be connected to operate a different solenoid valve to extend ram 50 to extend pusher bars 44, and then a 90-degree rotation of the cant will occur if the operator merely pushes both switches simultaneously. It will be apparent that, if desired, one such switch may be wired to actuate both the kicker arms and the pusher bars. Because the electrical and hydraulic or pneumatic connections for operating the rams shown in this disclosure may be completely straightforward and well within the skill of the art, these connections have not been shown. It will be seen that by repeated simultaneous operation of rams 43 and 50, the operator may rapidly rotate a cant to any one of its four angular orientations, noting the presence of defects, such as knots, as he does so, and then he may select a desired final angular orientation depending upon the way, for example, in which one or more knots extend through the cant, or depending upon the cross-sectional dimensions of the cant, so that the wood may be used more effficiently with less waste, or depending upon the requirements of a particular order then being processed.

The cant turning arrangement shown will be seen to be simple and reliable, inexpensive to fabricate, and rapid in operation. Unlike the previously mentioned prior art cant turner, it requires no plurality of electric motors and gearboxes, nor the use of roller chains, which are subject to appreciable wear. Also, the cant turner of the present invention does not require that the operator control the length of a time period during which rotation occurs. Therefore, operator action cannot result in a cant being turned more or less than 90° by reason of a timing error, and rotation in 90° increments can occur very rapidly. While the improved cant turning arrangement disclosed has great utility in the complete sawing assembly described herein, it is important to note that it may find important usage in a vaiety of different wood-processing operations where elongated cants and slabs or other pieces of rectangular cross-section must be rotated in 90° increments.

Figure 4:
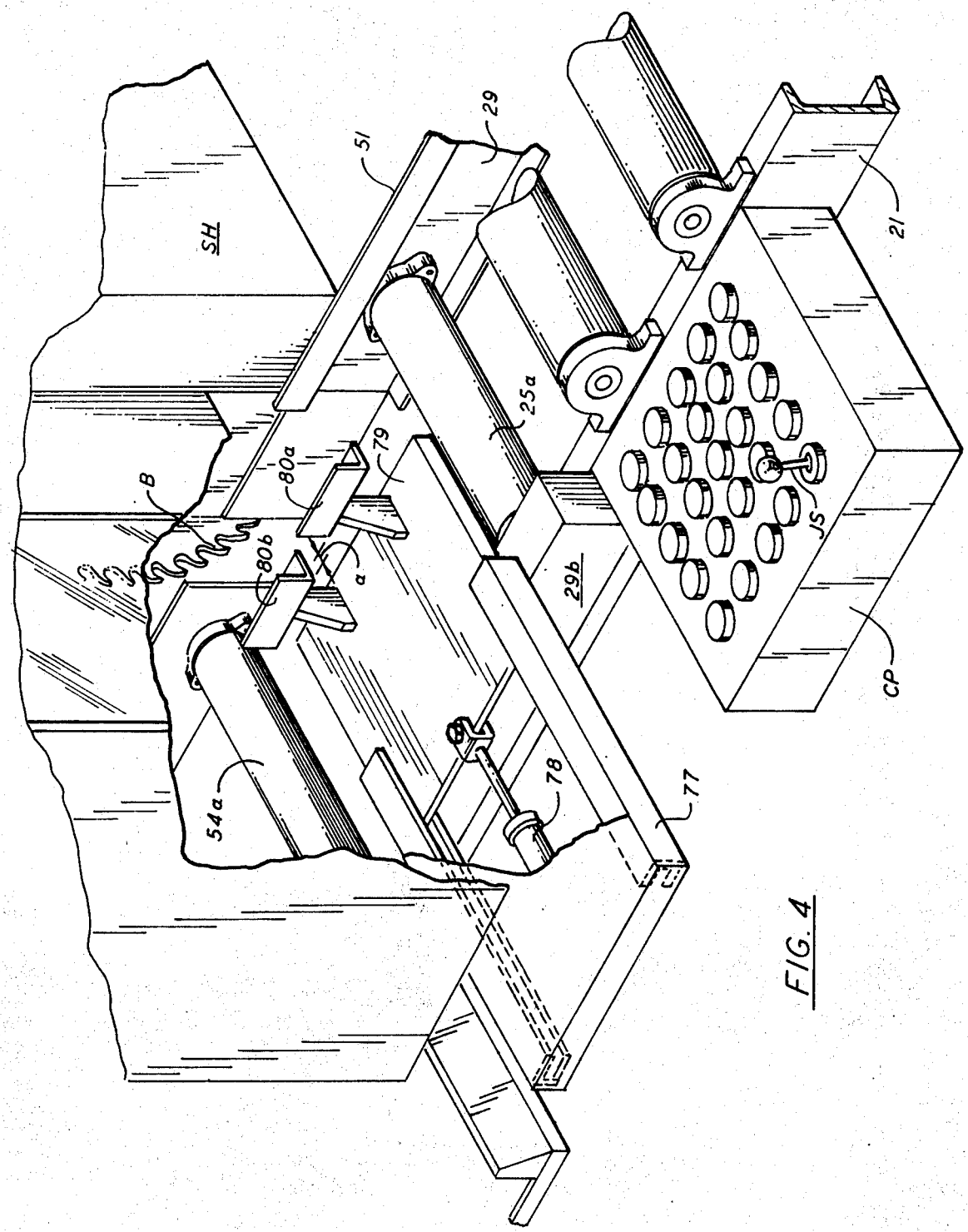
FIG. 4 is a perspective view of a portion of the assembly of FIG. 1 adjacent the cross-cut saw and the operator's control panel.

After he has rotated the cant to put the desired side "up", the operator feeds the cant forward, using a joystick JS (FIG. 4) on control panel CP to control the speed of a motor M which drives the rolls of the in-feed conveyor and certain rolls of the outfeed conveyor as will be further explained below. He extends stop ST1 (FIG. 5) which is located a short distance, such as one inch, past the saw. The canted rollers 25 move the cant along the infeed conveyor urging it against rail 51, until the leading edge of the cant strikes stop assembly ST1. The saw assembly SH is of known form and comprises a powered circular cross-cut saw blade on a traverse mechanism which moves the saw perpendicularly to the direction of the conveyor sides and guide rails. In FIGS. 1, 4 and 5 the blade of cross-cut assembly SH is shown in phantom as a dashed-line circle. Guide rail 51 terminates near the operating plane of the saw blade, so that the bottom edge of the saw blade may pass slightly below the plane of the tops of rolls 25, and thus allow transverse motion of the rotating saw blade to completely sever a cant which extends on both sides of the saw blade operating plane.

While it is highly desirable that no operator be stationed adjacent resaw RS because of the danger which that sometimes involves, no appreciable danger exists in locating an operator at control panel CP near the cross-cut saw assembly SH, since it uses a single blade. The danger associated with gang saws occurs when pieces of wood tend to jam or wedge between a pair of blades and be ejected by the blade pair at high velocity.

The out-feed conveyor 12 (FIG. 6b) includes a short first section 12a extending a short distance on the exit side of the saw, this section having a single row of rollers 54,54 mounted between channels 55,56 in the same way rollers 25 of the in-feed conveyor are mounted.

The out-feed conveyor 12 also includes a second section 12b having a double row of rollers, which section extends all the way into the multiple-blade ripping saw RS.

Plate 58 (FIG. 5) welded atop channel 56 carries a slide block 60 which slidingly supports one end of a slightly longitudinally-movable shaft or bar 61, the other end of which extends into a bore 62 and carries a flange 63 as shown in FIG. 5a. The bore in housing 62 contains a compression spring 64 which resists leftward (in FIGS. 5 and 5a) motion of bar 61 with a force determined by adjustment of set screw 65. Block 62 is supported above channel 56 by rigid post 66.

A plurality of stop assemblies ST1, ST2, ST3, etc., are slidingly adjustable along bar 61 to desired positions, where they may be locked in place by means of set screws such as those shown at 68. Each stop assembly comprise a base block portion 69 having a slit 70 extending to a bore which accommodates bar 61, so that tightening of screws 68 will firmly clamp the stop assembly on the bar. The lower portion of each base block 69 carries a respective transversely-extending four-sided hollow box section 71 slidingly carrying a respective slidable stop arm 72, the rear end of which is affixed to the ram of a respective pneumatic cylinder 74 carried on a respective plate 73 welded to the rear of the box section 71. The front end of each slidable stop arm 72 carries a respective stop block 75. When the rams of cylinders 74 are extended, as is shown for assemblies ST1 and ST2 in FIG. 5, their espective stop blocks 75 are withdrawn beyond the inner edge of plate 58, but when the ram of a given stop assembly is retracted, as is shown for stop assembly ST3 in FIG. 5, its associated stop block extends beyond the edge of plate 58, where it may engage the leading edge of a cant as the cant is moved forwardly on rollers 54.

When the operator feeds the cant forwardly with block 75 of stop assembly ST1 extending beyond edge 58a of plate 58, the leading edge of the cant eventually strikes that stop block, arresting forward motiion of the cant. The resilient mounting of bar 61 allows a very heavy cant to strike an extended stop block without damage to a stop assembly. After a slight bounce of the cant against an extended stop block, the cant will be stopped, with the continued rotation of the feed rollers urging the cant against the extended stop block and against plates 58b,58b which form extensions of guide plate 58.

A clamp assembly shown in FIG. 4 includes a housing 77 carrying a ram 78 which reciprocates plates 79 having angle clamp pieces 80a and 80b affixed thereto, with the upper face of the lower leg of each angle clamp being situated very slightly below the plane of the tops of rollers 25. Upon the extension of ram 78, clamps 80a and 80b urge the cant tightly against the rail 51 and edge 58a (FIG. 5), the two clamp pieces being arranged on opposite sides of the plane of the saw blade. The saw traverse mechanism is then advanced, cutting through the cant, and then the operator moves the joystick in the opposite transverse direction so that the blade is retracted. The direction and speed at which the in-feed rollers are operated are determined by the direction and amount of operator movement of joystick JS in the longitudinal direction one way or the other, and when the joystick is returned to a neutral longitudinal position, the in-feed rollers 25 are arranged to continue to rotate forwardly at a slow "creep" speed. Transverse or lateral movement of the joystick by the operator then moves the cross-cut saw mechanism in the transverse direction to cut the cant.

The vertical clamp face of clamp 80a is preferably located slightly rearwardly (e.g. ¼ inch) on plate 79 from that of clamp 80b, as indicated by dimension a in FIG. 4. When the operator moves the joystick in the opposite direction to retract the saw, the cut piece then moves away from the remainder of the cant at the creep speed of the rollers 54, with whichever stop assembly which was extended being automatically retracted when the joystick is moved through the transverse neutral position. When the cross-cut saw assembly is fully retracted, a switch in that assembly is operated to retract clamp ram 78.

The first cross-cut on most cants will be done with stop ST1 extended about 1 inch from the saw blade operating plane, so as to square the end of the cant, and then further cross-cuts will be performed, using one or several of the other stop assemblies. A conveyor TC (FIG. 1) extends below the saw assembly to carry away sawdust and the rough ends which are trimmed from cants. In typical operation, several stops will be located past the saw at distances corresponding to desired lengths of pallet stringers, while other stops will be located at distances corresponding to desired lengths of pallet deck boards.

As a piece cut from the cant moves forwardly on rollers 82,82 of the out-feed table, its leading edge eventually strikes flag 83 (FIGS. 5, 5b and 6b) which is mounted on shaft 83a (FIG. 5b) to pivot about a horizontal transverse axis, thereby operating a switch TM. If the operator has positioned a selector switch on control panel CP to one selected position, the operation of flag 83 will momentarily energize ram 84 (FIG. 7) thereby operating a plurality of kicker arms 85,85. As seen in FIG. 7, kicker arms 85 radially extend from shaft 86 journalled below the outfeed conveyor in bearings 87, and arm 88 extends from shaft 86 to be operated by ram 84. Upon actuation of ram 84, kicker arms 85 thereby rotate clockwise as viewed in FIG. 7, laterally moving the cut piece from atop rolls 82,82 to rolls 90,90 which form the other roller row of the out-feed conveyor, moving the piece against guide rail 91 and operating switch 92 (FIG. 6b) to retract ram 84 and return the kicker arms 85 to the position shown in solid lines in FIG. 7. Rolls 90 are canted in the opposite direction from rolls 82 and 95, and thus forward rotation of rolls 90 maintains the cut piece against rail 91. Guide rail 91 is mounted on threaded blocks 94a,94b (FIG. 6a) carried on threaded shafts 94c, 94d, the shafts carrying sprockets 94e,94f interconnected by a chain 94g so that by rotation of crank coupling 94h on shaft 94a the transverse position of guide rail 91 relative to the saw blades 93a,93a may be adjusted. The guide rail is than locked in place by tightening bolts such as that shown at 91a (FIG. 6b) extending through slots in tabs such as that at 91b. Thus the cut piece then will be fed into the multiple-blade ripping saw to be cut by blades 93a, 93a on that side of the ripping saw. If, instead, the operator has positioned the mentioned selector switch to an alternate position, operation of flag 83 will not operate ram 84 to translate kicker arms 85,85, and the cut piece will instead progress onto rollers 95, 95 in line with rollers 82, and rotation of canted rollers 82 will maintain the piece aligned against opposite guide rail 97, in the line with blades 93b,93b of the resaw assembly RS. Guide rail 97 is made laterally adjustable in the same manner as guide rail 91.

All of the in-feed rolls 25 and 25a, and the out-feed rolls 54,54a and 82 are driven by a single motor M (FIG. 6b) located below the out-feed table. Motor M drives rolls 82, 54 and 54a via a chain-sprocket arrangement like that of FIG. 2a carried within housing 12c in FIG. 6b. The roll 54a nearest the cross-cut saw blades carries sprockets on both ends of its shaft, so that drive power is transmitted transversely via the shaft of roll 54a to sprocket housing 29b (FIGS. 4, 5 and 6b) on the opposite side of the conveyors from the cross-cut saw. By using two slightly different sprocket sizes on the two ends of roll 54a, the speed of the outfeed rolls is made to be slightly greater than that of the in-feed rolls 25, so that after a piece has been cut by the cross-cut saw it tends to speed ahead of the remaining part of the cant, which the operator will next advance to a selected stop. The in-feed roll 25a (FIG. 4) nearest the cross-cut saw blade is also equipped with a sprocket on each end of its shaft, so that it transmits drive power transversely to sprocket housing 29 (FIGS. 2 and 4). Unlike the other conveyor rolls, rolls 25a and 54 which transmit power across the conveyors are preferably not canted, so that use of wobble-type couplings is not needed to avoid chain-sprocket wear. Rolls 90 and 95 (FIG. 6a and 6b) are driven through similar sprocket-chain systems from the resaw assembly RS, two chain-sprocket housings for that purpose being shown at 29d and 29e in FIG. 6a. The rolls 90 and 95 are driven separately from the in-feed rolls and out-feed rolls 54 and 82 so that cutting of a piece by the resaw RS can continue without interruption if the operator stops the in-feed rolls, or even reverses them, as sometimes may be necessary if the leading end of a cant passes a desired stop.

Due to the damage which high-velocity pieces of wood can cause, the entry end of the multiple-blade ripping saw RS is largely enclosed by a protective housing indicated by dashed lines in FIG. 6a and partially shown in FIG. 8. A plurality of heavy metal bars 98,98 are individually pivotally suspended on a shaft 99. As a piece of wood is fed into the resaw assembly on either rolls 90,90 or rolls 95,95, it will effect the lower ends of a number of bars 98 upwardly toward the inside of the resaw, the number deflected depending, of course, upon the width of the piece of wood, and the lower ends of the deflected bars will rub on the top of the wood piece as it enters the resaw. The remaining undeflected bars will remain in their lowered position, forming a heavy metal "curtain" which will impede if not prevent, rearward ejection of pieces of wood at high velocity. Stop bars 98a prevent the pivoting bars 98 from swinging rearwardly from their vertical position shown in FIG. 8. A second similar "curtain" of pivotable bars (not shown) is used further inside the resaw for added protection. Despite the use of such "antikickback" arrangements, which have been known for some years, pieces of wood are sometimes ejected with sufficient force to emerge rearwardly from the resaw and to injure persons stationed nearby. A horizontal bar 98c extends across the forward sides of pivotal bars 98 and has its ends affixed to opposite ends of shaft 99. Movement of crank arm 100 in the direction indicated by the arrow causes bar 98c to engage the forward sides of bars 98 as shown at 98d and swing bars 98 upwardly to clear a piece of wood should it be desired to move the piece rearwardly out of the resaw.

A pair of shafts 101,102 within the resaw housing have their outer ends journalled in bearings (not shown) on opposite sides of the resaw assembly and they extend through a stop-reversing assembly 103. Shaft 101 carries stop pad or flag 104, and shaft 102 carries similar pad 105. As diagrammatically illustrated in FIG. 8a, stop-reversing assembly 103 comprises a sprocket 106 affixed to shaft 101 and a sprocket 107 on shaft 102, with a length of chain 108 interconnecting the two sprockets having its respective ends fastened to the two sprockets. If a piece of wood enters the resaw on rollers 95 and deflects pad 105 to a substantially horizontal position, rotating shaft 102 counterclockwise by 90° it will be seen that sprocket 106 and shaft 101 will be rotated clockwise through 90°, raising pad 104 to a substantially vertical position, so that pad 104 extends substantially above the plane of the tops of rollers 90, preventing the feeding of a piece of wood to blades 93a,93a. Conversely, the presence of a piece of wood which holds pad 104 substantially horizontal will be seen automatically to hold stop pad 105 substantially vertical, preventing the feeding of a piece of wood to blades 93b. As thus far explained, the stop-reversing mechanism would become inoperative, if, for example, flag 105 were to flop clockwise to a vertical position, providing slack in chain 108 and allowing flag 104 to also rotate to a downward position. To prevent such an occurrence, one of several strategms may be employed. The chain 108 in FIG. 8a limits counterclockwise motion of flag 104 and clockwise motion of flag 105, but not motion of these flags in opposite directions. By provision of additional sprockets 106a and 170a, together with oppositely-wound chain 108a, motion in the opposite directions are limited. It is not necessary, however, to use four sprockets and two chains. If only sprockets 106 and 107 and chain 108 are used, clockwise motion of shafts 101,102 and pads 104,105 may be limited by means of fixed stops (not shown), so that, like the double-chain system shown, the motions of pads 104 and 105 are limited to roughly 90°.

The use of a bi-stable or toggle-like stop mechanism of the type described results in important economies by preventing simultaneous cutting by both gangs of blades. Since only one gang of blades can cut at a given time, the horsepower requirements for the saw blade arbors are substantially lessened. Furthermore, if boards could be fed to the two gangs simultaneously, a much more expensive pressure-roll arrangement would be required, as will be explained below. However, in embodiments of the invention where such expenses are not deemed of paramount importance, the use of the toggle stop mechanism may be omitted without departing from the broader aspects of the invention.

As a piece of wood is being fed by rollers 90 against guide rail 91 toward multiple blades 93a, or as it is being fed by rollers 95 against guide rail 97 toward multiple blades 93b, after its leading end has deflected either stop pad 104 or stop pad 105, its leading end passes over several feed rolls, only one of which is shown at 111. A vertically-movable pressure roll assembly (not shown) of known form includes a roll generally above roll 111 which urges the piece of wood down onto roll 111 with a predetermined force applied by a pneumatic ram when a flag-operated switch senses the leading end of the piece of wood. Such a vertically-movable pressure roll is shown in dashed lines at PR in FIG. 6a. The feed roll 111 and the pressure roll are provided with splines, teeth or other roughened surfaces so that they grip the piece of wood and feed it through and past the saw blades. Similar feed rolls and a vertically movable pressure roll are included in the resaw assembly beyond the saw blades, to pull the then multiple-sawn pieces forwardly after their leading edges emerge from the saw blades, and after the trailing edge of the piece of wood has progressed past the entry feed rolls such as roll 111. If a stop mechanism is not used to prevent simultaneous feeding of pieces to both gangs of blades, separate pressure rolls must be provided for each side or bay of the resaw rather than using single pressure rolls which extend across both bays. Otherwise, one of the pieces being fed may not be gripped between the pressure rolls and feed rolls, unless the two pieces have exactly the same thickness, and if not firmly gripped, a piece may be expelled from the machine to cause damage or injury.

While the pusher bar actuating ram 50 (FIG. 2) is conncted to an arm 49 which extends from shaft 47 and is linked to one pusher 44, one could instead connect ram 50 to a further arm (not shown) which similarly extends from shaft 47 but which is not directly connected to a pusher bar, with no apparent advantage. While the arrival of a cut piece is shown sensed in FIG. 5b by a switch which is mechanically operated by flag plate 83, those skilled in the art will recognize that a photosensor arrangement could be substituted without departing from the invention. As previously suggested, any of the rams shown may be either a hydraulic or a pneumatic type, and even electric motors with rotary-to-linear motion-converting mechanisms conceivably could be substituted, although I much prefer the use of simple expansible-chamber rams. In FIG. 8b wherein a single sprocket pair and single chain is shown used for the dual-feed prevention mechanism 103, pads 101a and 102a on shafts 101 and 102 strike pins 101b, 102b to limit rotation of the shafts 101,102. A further alternative usable form of stop means may comprise a gear system of the nature shown in FIG. 8b wherein rotation of the four gears is limited to 90° by filled teeth FT on one or more gears. The two intermediate gears may be omitted if the gears on the shafts carrying stop pads 104,105 are large enough in diameter to accommodate stop pads of the radial length desired.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A sawmill assembly, comprising, in combination: first conveyor means, a reciprocable cross-cut saw assembly; second conveyor means; a multiple-blade ripping saw assembly, and an operator control station for controlling said first and second conveyor means and said assemblies, said first conveyor means being adapted to receive an elongated piece of lumber and operable under control of said operator to transport said piece endwise in a first direction toward said cross-cut saw assembly, said second conveyor means including a plurality of reciprocable stop means spaced apart in said first direction and selectively operable by said operator to extend into the path of said piece to arrest motion of said piece in said first direction, said cross-cut saw assembly including a powered circular saw blade reciprocable under control of said operator to move in a second direction transverse to said first direction to cut said piece of lumber, said multiple-blade ripping saw assembly including first and second groups of rotatably powered saw blades spaced apart in said second direction, said second conveyor means being operable to transport pieces cut by said cross-cut saw assembly to said ripping saw assembly and including transfer means selectively controllable by said operator to selectively move said cut pieces into alignment with either said first group or said second group of blades of said ripping saw assembly.

2. An assembly according to claim 1 wherein said first conveyor means includes means controllable by said operator at said control station for rotating said piece of lumber about an axis extending in said first direction.

3. An assembly to claim 1 wherein said first conveyor means includes guide means extending in said first direction, a first plurality of arms controllable by the operator to push said piece of lumber in said second direction against said guide means, and a second plurality of arms controllable by said operator together with said first plurality of arms for rotating said piece of lumber about an axis extending in said first direction.

4. An assembly according to claim 1 wherein said second conveyor means includes a first conveyor section extending from said cross-cut saw assembly to said ripping saw assembly in alignment with said first group of saw blades, a second conveyor section extending in said first direction laterally adjacent to a portion of said first conveyor section and in alignment with said second group of saw blades, said transfer means being operable to move said pieces from said first conveyor section to said second conveyor section.

5. An assembly according to claim 1 wherein said second conveyor means comprises first and second rows of cylindrical conveyor rolls with the rotational axes of the rolls of said first row being canted at a first angle from said second direction and the rotational axes of the rolls of said second row being canted from said second direction at a second angle opposite in sense from its first angle.

6. An assembly according to claim 1 wherein said second conveyor means comprises first and second rolls, the rolls of each of said rams being spaced apart in said first direction, and said transfer means comprises a shaft rotatably journalled below said second conveyor means, a plurality of arms extending generally radially from said shaft between respective pairs of said rolls, and means for rotating said shaft.

7. An assembly according to claim 1 wherein said second conveyor means includes first and second stop means each operable upon actuating to prevent travel of one of said cut pieces to a respective one of said groups of blades, and means interconnecting said stop means so that each of said stop means is actuated to prevent travel of one of said cut pieces when another of said cut pieces is passing the other of said stop means.

8. An assembly according to claim 6 wherein said means for rotating said shaft comprises a spring-biased switch-actuating means normally extending above the plane of said first row of rolls to be operated upon arrival of one of said cut pieces at a predetermined position.

9. An assembly according to claim 6 wherein said means for rotating said shaft comprises sensing means for sensing the arrival of one of said cut pieces at a predetermined location along said first row of rolls to provide a signal, and motive means responsive to said signal for rotating said shaft.

10. An assembly according to claim 7 wherein each of said stop means comprises a pair of shafts each carrying a radially extending stop pad, sprocket means on each of said shafts, and chain means interconnecting said sprocket means.

11. An assembly according to claim 1 wherein one end of said first conveyor means extends to said cross-cut saw assembly and said operator control station is located adjacent said end of said first conveyor means.

12. An assembly according to claim 1 having a vertically-movable pressure roll for urging said cut pieces downwardly as they are cut by either said first group or said second group of blades of said ripping-saw assembly.

13. An assembly according to claim 1 wherein said saw blade of said cross-cut saw assembly is transversely movable between a first position above one end of said conveyor means and a second position on a first side of said end of said first conveyor means, and wherein said operator control station is located on a second side of said first conveyor means opposite from said first side.

14. Sawing apparatus, comprising, in combination: a reciprocable cross-cut saw assmebly; a multiple-blade ripping saw assembly; conveyor means extending in a first direction between said cross-cut saw assembly and said ripping saw assembly; and an operator control station located adjacent said cross-cut saw assembly for controlling said conveyor means and said saw assemblies, said ripping saw assembly including first and second gangs of rotatably powered saw blades spaced apart in a second direction perpendicular to said first direction, said conveyor means including transfer means controllable from said operator station to selectively move pieces of wood on said conveyor means into alignment with either said first gang or said second gang of blades of said ripping saw assembly.

15. Apparatus according to claim 14 which includes second conveyor means extending to said cross-cut saw assembly and including means for rotating a piece of lumber about an axis parallel to the direction of said second conveyor means, said second conveyor means and said means for rotating being connected to be controlled from said operator station.

* * * * *